(12) United States Patent
Corbille et al.

(10) Patent No.: US 9,513,451 B2
(45) Date of Patent: Dec. 6, 2016

(54) OPTICAL FIBRE DISTRIBUTION ENCLOSURE

(71) Applicant: 3M INNOVATIVE PROPERTIES COMPANY, St. Paul, MN (US)

(72) Inventors: Christophe Corbille, Saint Nicolas de Redon (FR); Patrick Drouard, Pontchateau (FR); Jesús Estrada, Madrid (ES); Guy J. Barthes, Cluses (FR); Christophe Desard, Herbignac (FR)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/432,535

(22) PCT Filed: Oct. 2, 2013

(86) PCT No.: PCT/US2013/062970
§ 371 (c)(1),
(2) Date: Mar. 31, 2015

(87) PCT Pub. No.: WO2014/055592
PCT Pub. Date: Apr. 10, 2014

(65) Prior Publication Data
US 2015/0253528 A1 Sep. 10, 2015

(30) Foreign Application Priority Data

Oct. 2, 2012 (EP) ..................................... 12186926

(51) Int. Cl.
*G02B 6/44* (2006.01)
*G02B 6/38* (2006.01)

(52) U.S. Cl.
CPC ........... *G02B 6/4452* (2013.01); *G02B 6/3897* (2013.01); *G02B 6/4454* (2013.01); *G02B 6/4455* (2013.01); *G02B 6/4471* (2013.01); *G02B 6/4494* (2013.01)

(58) Field of Classification Search
CPC ..................................... G02B 6/44; G02B 6/38
(Continued)

(56) References Cited

U.S. PATENT DOCUMENTS 4,902,855 A   2/1990   Smith
4,924,034 A   5/1990   Truesdale
(Continued)

FOREIGN PATENT DOCUMENTS

GB   2367378   3/2002
GB   2368136   4/2002
(Continued)

OTHER PUBLICATIONS

International Search report for PCT International Application No. PCT/US2013/062970 mailed on Dec. 16, 2013, 7 pages.

*Primary Examiner* — Kaveh C Kianni
(74) *Attorney, Agent, or Firm* — Janet A. Kling (57) ABSTRACT

Optical fiber distribution enclosure (1), comprising a housing base (40) and a housing cover (20), engageable with each other to form a housing of the enclosure (1), a slack fiber storage device (50), arranged within the housing when the housing base (40) and the housing cover (20) are engaged with each other, a tray holder (60), arranged within the housing when the housing base (40) and the housing cover (20) are engaged with each other, on which tray holder (60) one or more fiber-optic trays (70) can be mounted, characterized in that the housing base (40), the slack fiber storage device (50) and the tray holder (60) are integrally formed as one piece.

12 Claims, 6 Drawing Sheets (58) Field of Classification Search
USPC .......................................................... 385/135
See application file for complete search history.

(56) References Cited

U.S. PATENT DOCUMENTS

| | | | |
|---|---|---|---|
| 5,255,337 A | | 10/1993 | Theys |
| 5,553,186 A | | 9/1996 | Allen |
| 5,631,993 A | * | 5/1997 | Cloud et al. .................. 385/135 |
| 5,644,671 A | * | 7/1997 | Goetter et al. ................ 385/135 |
| 5,758,004 A | | 5/1998 | Alarcon |
| 6,215,939 B1 | * | 4/2001 | Cloud ........................... 385/135 |
| 6,827,597 B1 | * | 12/2004 | Metzbower et al. ......... 439/320 |
| 8,213,761 B2 | * | 7/2012 | Gronvall et al. ............. 385/135 |
| 8,472,775 B2 | * | 6/2013 | Corbille et al. .............. 385/135 |
| 2002/0191937 A1 | * | 12/2002 | Knox et al. ................... 385/135 |
| 2005/0145522 A1 | * | 7/2005 | Bloodworth et al. ........ 206/409 |
| 2005/0213921 A1 | * | 9/2005 | Mertesdorf et al. .......... 385/135 |
| 2005/0271344 A1 | * | 12/2005 | Grubish et al. ............... 385/135 |
| 2007/0172192 A1 | | 7/2007 | Smrha |
| 2009/0046985 A1 | * | 2/2009 | Gronvall et al. ............. 385/135 |
| 2009/0060421 A1 | * | 3/2009 | Parikh et al. .................... 385/71 |
| 2009/0185782 A1 | * | 7/2009 | Parikh et al. ................. 385/135 |
| 2010/0183274 A1 | * | 7/2010 | Brunet et al. ................ 385/135 |
| 2011/0181158 A1 | | 7/2011 | Bran de Leon |
| 2013/0209049 A1 | * | 8/2013 | Kowalczyk et al. ......... 385/135 |

FOREIGN PATENT DOCUMENTS

| | | |
|---|---|---|
| WO | WO 94-14095 | 6/1994 |
| WO | WO 00-57230 | 9/2000 |
| WO | WO 03-040774 | 5/2003 |
| WO | WO 2005-088373 | 9/2005 |
| WO | WO 2009-106874 | 9/2009 |
| WO | WO 94-24599 | 10/2010 |
| WO | WO 2013-106183 | 7/2013 |
| WO | WO 2015-009435 | 1/2015 |
| WO | WO 2015-047508 | 4/2015 |

* cited by examiner

OPTICAL FIBRE DISTRIBUTION ENCLOSURE

BACKGROUND OF THE INVENTION

Field of the Invention

The present invention relates to a distribution enclosure for optical fibres in telecommunication networks and a manufacturing method for such an enclosure.

Background

In fibre-optic networks, a feeder cable leads a large number of optical fibres towards a geographical area in which a number of customers, e.g. households or enterprises, are located. In the vicinity of the customers, some of the optical fibres of the feeder cable are connected to other optical fibres, so-called drop fibres, which lead to individual customers. This connection of feeder cable fibres to drop fibres is often done by splices. At a splice, a bare feeder cable fibre is mechanically and optically coupled to a bare drop fibre. In order to protect splices against environmental impacts, splices are often arranged in distribution enclosures. These enclosures may, for example, have a base and a cover forming a housing, and a seal between base and cover to keep dust and water out. Besides protection of fibres and splices, such enclosures often also facilitate an orderly arrangement of the splices. In particular, some enclosures can accommodate a number of so-called splice trays, which provide locations for splices and space for storage of fibre overlength ("slack storage") in a space-saving arrangement. Often, a number of such splice trays can be mounted, e.g. in a fixed or pivotable manner, on a tray holder, which itself is fixed to the inside of the housing.

In a distribution enclosure, normally only some fibres of the feeder cable will be spliced to drop fibres. The remaining feeder cable fibres, sometimes called "express fibres", remain intact and unspliced. They are therefore not routed into splice trays. The distribution enclosure must, however, provide storage space for the overlength of those express fibres. For that purpose, many distribution enclosures comprise a separate slack fibre storage compartment, which can be used to store overlength of express fibres and of other fibres or cables.

An enclosure, or closure, of generally such a type is described in the international patent application WO 94/24599. That closure includes a frame having a partition wall to define front and rear access areas for the enclosure. The frame carries one or more splice trays on a first surface portion making the splices accessible from the front or first access area. A slack storage compartment is provided on the second surface portion.

The U.S. Pat. No. 5,553,186 discloses a fibre optic dome closure which has a body with a closed end and an open end, a tubular base releasably secured to the open end, a strain relief member attached to the base, having cable ports therein, and several fiber optic storage trays supported in the body. The trays include a transition tray which receives excess fiber slack, and two or more splice trays hingedly attached at a common end to either the transition tray or to another splice tray.

A further fibre optic splice closure is described in the international patent application WO 03/040774 A2. The closure comprises a tray holder, secured to a bottom cover of the closure, and a substantially planar splice tray. The closure is configured to store slack fibers around the perimeter of the tray holder and the splice trays.

In traditional fibre optic enclosures, the housing, the tray holder and/or the slack fibre storage compartment are separate parts which are connected to each other during assembly of the enclosure. Separate parts require separate manufacturing steps and separate tools for the manufacturing process, e.g. separate plastic molds. Assembling the separate parts to form the enclosure requires extra time. The present invention aims at addressing these problems.

SUMMARY

The present invention provides an optical fibre distribution enclosure, comprising a housing base and a housing cover, engageable with each other to form a housing of the enclosure, a slack fibre storage device, arranged within the housing when the housing base and the housing cover are engaged with each other, a tray holder, arranged within the housing when the housing base and the housing cover are engaged with each other, on which tray holder one or more fibre-optic trays can be mounted, characterized in that the housing base, the slack fibre storage device and the tray holder are integrally formed as one piece.

Due to the slack storage device, the tray holder and the housing base being integrally formed as one piece, only one single part needs to be manufactured to provide these elements. Hence only a single manufacturing tool may be required, instead of three tools. If, for example, the slack storage device, the tray holder and the housing base used to be molded in three steps separately using three molds, an enclosure according to the invention may require a single molding step only, and a single mold. Also, the enclosure according to the invention may require less assembly steps, because it may not require assembly steps to install, e.g., a tray holder on the housing base, and/or a slack storage device on the housing base. Also, the enclosure may be mechanically more stable, because there are a smaller number of separate elements that can move relative to each other.

The enclosure may comprise a base element, which comprises the housing base, the slack fibre storage device and the tray holder. The base element may be integrally formed as one piece. The advantages of the enclosure comprising a base element, integrally formed as one piece, are the same as listed in the preceding paragraph.

In a specific embodiment, the optical fibre distribution enclosure comprises a housing cover and a base element, the base element comprising a slack fibre storage device portion, a tray holder portion, on which tray holder portion one or more fibre-optic trays can be mounted, and a housing base portion, wherein the housing base portion and housing cover are engageable with each other to form a housing of the enclosure, the slack fibre storage device portion and the tray holder portion being arranged inside the housing, the enclosure being characterized in that the base element is integrally formed as one piece. In this embodiment, the slack fibre storage device portion is a slack fibre storage device, the tray holder portion is a tray holder, and the housing base portion is a housing base of the enclosure.

The housing base, the slack fibre storage device and the tray holder may be integrally formed from polymeric material. Polymeric material may be particularly cost-effective for manufacturing and may allow for using a standard, cost-effective molding process to be used for manufacturing. Polymeric material may result in the enclosure having a lower weight and being mechanically and chemically more resistant. The housing base, the slack fibre storage device and the tray holder may be integrally formed from a same polymeric material. This may allow for a particularly cost-effective manufacturing of the enclosure, because only one type of polymeric material is required for manufacturing the housing base, the slack fibre storage device and the tray holder.

The housing base may be the only element of the enclosure which is adapted to allow entry of a fibre-optic cable or of an optical fibre into the enclosure. The housing base may comprise an entry opening, adapted for entry of a fibre-optic cable or of an optical fibre into the enclosure. The entry opening may be adapted to accommodate a fibre entry port device, e.g. an entry port device that An entry opening may be integrally formed as one piece with the housing base, the slack fibre storage device and/or the tray holder. An entry opening may be closed by a closing wall. The closing wall may provide tight sealing of the entry opening against entry of liquid and gas into the enclosure. The closing wall may be manually breakable or manually removable from the entry opening. The closing wall may be integrally formed as one piece with the housing base, the slack fibre storage device and/or the tray holder.

An enclosure in which only the housing base allows for entry of a fibre-optic cable or of an optical fibre into the enclosure is advantageous in that such an enclosure may be easier to install, because all incoming cables or fibres can be guided to the same area, i.e. the area of the housing base, to enter into the enclosure. Also, means for strain relief of incoming fibres or cables need to be provided in one area of the enclosure only, namely on or next to the housing base. This may save space inside the enclosure, and may make installation of cables or fibres to the enclosure easier and quicker.

In one embodiment of the invention, the slack fibre storage device may be arranged between the housing base and the tray holder. The slack fibre storage device may be arranged above and adjacent to the housing base, when the enclosure is arranged such that the housing base is located at the bottom of the enclosure. The tray holder may be arranged above and adjacent to the slack fibre storage device, when the enclosure is arranged such that the housing base is located at the bottom of the enclosure. The slack fibre storage device may be arranged above and adjacent to the housing base, and the tray holder may be arranged above and adjacent to the slack fibre storage device, when the enclosure is arranged such that the housing base is located at the bottom of the enclosure. These arrangements of elements may make routing of fibres inside the enclosure more efficient. It may, for example, be more efficient to provide slack storage in a location between entry of fibres at the housing base, and splicing of fibres in fibre trays, so that only an end portion of a fibre is routed into a fibre tray for splicing, thereby avoiding clutter from having meters of overlength fibre in the splice tray.

In alternative embodiment of the invention, the tray holder may be arranged between the housing base and the slack fibre storage device. The tray holder may be arranged above and adjacent to the housing base, when the enclosure is arranged such that the housing base is located at the bottom of the enclosure. The slack fibre storage device may be arranged above and adjacent to the tray holder, when the enclosure is arranged such that the housing base is located at the bottom of the enclosure. The tray holder may be arranged above and adjacent to the housing base, and the slack fibre storage device may be arranged above and adjacent to the tray holder, when the enclosure is arranged such that the housing base is located at the bottom of the enclosure. These arrangements of elements may make routing of fibres inside the enclosure more efficient.

The housing base may comprise an entry opening or a plurality of entry openings for entry of a cable or of a fibre into the enclosure. An entry opening may facilitate routing of a fibre or of a cable into the enclosure without requiring additional work for creating an opening during installation of the enclosure and the fibres and/or cables. An entry opening may be closed by a thin wall. A thin wall may provide sealing of the enclosure as long as the entry opening, which it closes, is not in use. When needed, a thin wall may be easily breakable or removable, in order to allow a fibre enter the enclosure. An entry opening may be shaped to receive a fibre entry port or a cable entry port. Such an entry opening may allow for the use of fibre entry ports or cable entry ports, which in turn facilitate sealing of the enclosure at the entry opening and/or strain relief for fibres or cables entering the enclosure through the entry opening.

An enclosure according to the present invention may be adapted to support a fibre optic connector or a plurality of fibre optic connectors. The enclosure may therefore comprise a support element for supporting one or more fibre optic connectors. The support element can hold a plurality of fibre optic connector adapters configured to accept and facilitate mating of two fibre optic connectors. The fibre optic connector adapters can be configured to accept two standard format optical connectors disposed within the enclosure or a first optical connector inserted through an entry opening and a second optical connector disposed within the enclosure. Furthermore, the support may provide a well-defined position for fibre-optic connectors, and may thus prevent connectors from moving when the enclosure is moved. The support may keep connectors out of the way of movement of fibre-optic trays. The support element may be a separate piece from the housing base, the slack fibre storage device, the tray holder and/or the base element comprising the housing base, the slack fibre storage device, the tray holder. Alternatively, the support element may be integrally formed as one piece with the housing base, the slack fibre storage device and the tray holder. The support element may be integrally formed as one piece with a base element, which comprises the housing base, the slack fibre storage device and the tray holder and is integrally formed as one piece with the housing base, the slack fibre storage device and the tray holder. Alternatively, an optical fibre connector adapter can be disposed directly within the entry opening to facilitate connection of a first optical connector inserted through an entry opening and a second optical connector disposed within the enclosure. Such enclosures may thus be used in applications with fibre optic connectors and is more versatile, in particular, the functionality allowing plug-and-play connectivity of pre-terminated or field terminated drop fibre cables.

The housing cover of the enclosure may form a cavity for accommodating the slack fibre storage device and the tray holder. The cavity may have a longitudinal shape, e.g. a cylindrical shape or the shape of a cube with rounded edges. The cavity may comprise a closed end and an open end, the open end being arranged opposite to the closed end. Enclosures comprising a cavity may be particularly easy and quick to assemble and to install. An enclosure with a closed end and an opposed open end may be particularly rugged. The enclosure may, for example, be a dome-shaped enclosure. The open end of a cavity of an enclosure may have a circular shape, like, for example, the opening of a bucket or of a bottle. The open end may have a peripheral lower rim, lying in the plane of the opening. Such openings may facilitate proper sealing and may allow for the use of a housing base of a particularly simple geometrical shape. The lower rim may have a circular shape. Alternatively, the open end of a cavity of an enclosure may have a straight-O shape, i.e. a shape of an O with straight sides and semicircular top and bottom. Such shapes may be particularly easy and cost-effective to manufacture, and sealing gaskets may conform well into such geometrical shapes without sharp bends.

The housing base may comprise a cover fastening element or a plurality of cover fastening elements, for engagement of the housing cover with the housing base. The cover fastening element may be integrally formed as one piece with the housing base, the slack fibre storage device and the tray holder. The cover fastening element may be integrally formed as one piece with a base element, which comprises the housing base, the slack fibre storage device and the tray holder and is integrally formed as one piece with the housing base, the slack fibre storage device and the tray holder. A cover fastening element, integrally formed, may make manufacturing and/or assembly of the housing base and of the enclosure easier and more cost-effective, because less separate molds may be required and/or less steps may be required for assembly of the enclosure.

The cover fastening element may comprise a latch opening, operable to engage with a latch on the housing cover such as to engage the housing base with the housing cover. Alternatively, the cover fastening element may comprise a latch, operable to engage with a latch opening on the housing cover such as to engage the housing base with the housing cover. A latch-based mechanism to engage the housing cover with the housing base may be self-engaging and thus particularly easy to engage when the enclosure is closed by attaching the housing cover to the housing base during installation of the enclosure.

The enclosure may comprise fastening means for fastening the enclosure to a support. The fastening means may be integrally formed as one piece with the housing base, the slack fibre storage device and the tray holder. The fastening means may be integrally formed as one piece with a base element, which comprises the housing base, the slack fibre storage device and the tray holder and is integrally formed as one piece with the housing base, the slack fibre storage device and the tray holder. Fastening means, integrally formed, may make manufacturing and/or assembly of the enclosure easier and more cost-effective, because less separate molds may be required and/or less steps may be required for assembly of the enclosure.

The enclosure may comprise a sealing gasket for sealing the enclosure, the sealing gasket being arranged such that, when the housing base and a housing cover are engaged with each other to form a housing of the enclosure, the sealing gasket contacts the housing base and the housing cover and provides sealing of the enclosure between the housing base and the housing cover. A sealing gasket may prevent entry of dust, air or water into the enclosure. Thereby, the enclosure provides better protection for the optical fibres or fibre cables in the enclosure. Sealing the enclosure with a gasket may make the enclosure suitable for use in harsh environments, like, e.g. underground or under water or in dusty environment.

The housing base may comprise a gasket groove for accommodating a sealing gasket. The gasket groove may be integrally formed as one piece with the housing base, the slack fibre storage device and the tray holder. The gasket groove may be integrally formed as one piece with a base element, which comprises the housing base, the slack fibre storage device and the tray holder and is integrally formed as one piece with the housing base, the slack fibre storage device and the tray holder. The gasket groove, integrally formed or not, may permit precise positioning of the gasket relative to the housing base, which in turn may enhance the quality and the strength of the sealing effect of the gasket.

The housing base may be flat. It may comprise a flat surface. The slack fibre storage device and the tray holder may be arranged on a support panel. The support panel may extend perpendicularly from the flat surface of the housing base. The support panel may extend from an edge portion of the flat surface. The support panel may be integrally formed as one piece with the housing base, the slack fibre storage device, and/or the tray holder. The support panel may be integrally formed as one piece with a base element, which base element comprises the housing base, the slack fibre storage device and the tray holder. The support panel and the base element may be integrally formed as one piece. The support panel may be advantageous in that it may provide mechanical stability to the enclosure. In particular, a support panel integrally formed as one piece with the housing base, the slack fibre storage device, and the tray holder may provide improved mechanical stability to the enclosure, which may be essential to prevent damage, e.g. during installation of cables and fibres in the enclosure. An integrally formed support panel may also be more cost-effective to manufacture than a separate support panel.

The enclosure may be adapted such that at least four fibre-optic trays can be mounted on the tray holder. The housing of the enclosure may be watertight when closed. The volume of water displaced by the enclosure when the enclosure is closed and completely submerged in water, may be 2 liters (i.e. 2 dm$^3$) or less. In a specific embodiment of the invention, the enclosure is adapted such that at least four fibre-optic trays can be mounted on the tray holder, and the housing of the enclosure is watertight when closed, and the volume of water displaced by the enclosure when the enclosure is closed and completely submerged in water, is 2 liters (i.e. 2 dm$^3$) or less. Such an enclosure provides good protection against water and occupies little space. It may therefore be usable in locations where humidity and water are present, and/or where space is limited.

The invention provides, in a further aspect, a method of manufacturing an optical fibre distribution enclosure, comprising a housing base, engageable with a housing cover to form a housing of the enclosure, a slack fibre storage device, arrangeable within the housing, and a tray holder, arrangeable within the housing, on which tray holder one or more fibre-optic trays can be mounted, characterized in that the manufacturing method comprises a step of integrally forming the housing base, the slack fibre storage device and the tray holder as one piece.

Integrally forming the housing base, the slack fibre storage device and the tray holder as one piece may save manufacturing process steps and may require less manufacturing tools, thereby speeding up the manufacturing process and making it more cost-effective. Similarly, the integral forming of guiding and latching structures in the base and cover simplify manufacturing and installation of the exemplary enclosure.

BRIEF DESCRIPTION OF THE DRAWINGS

The invention will now be described in more detail with reference to the following Figures exemplifying a particular embodiment of the invention.

DETAILED DESCRIPTION

Herein below various embodiments of the present invention are described and shown in the drawings wherein like elements are provided with the same reference numbers.

Figure 1:
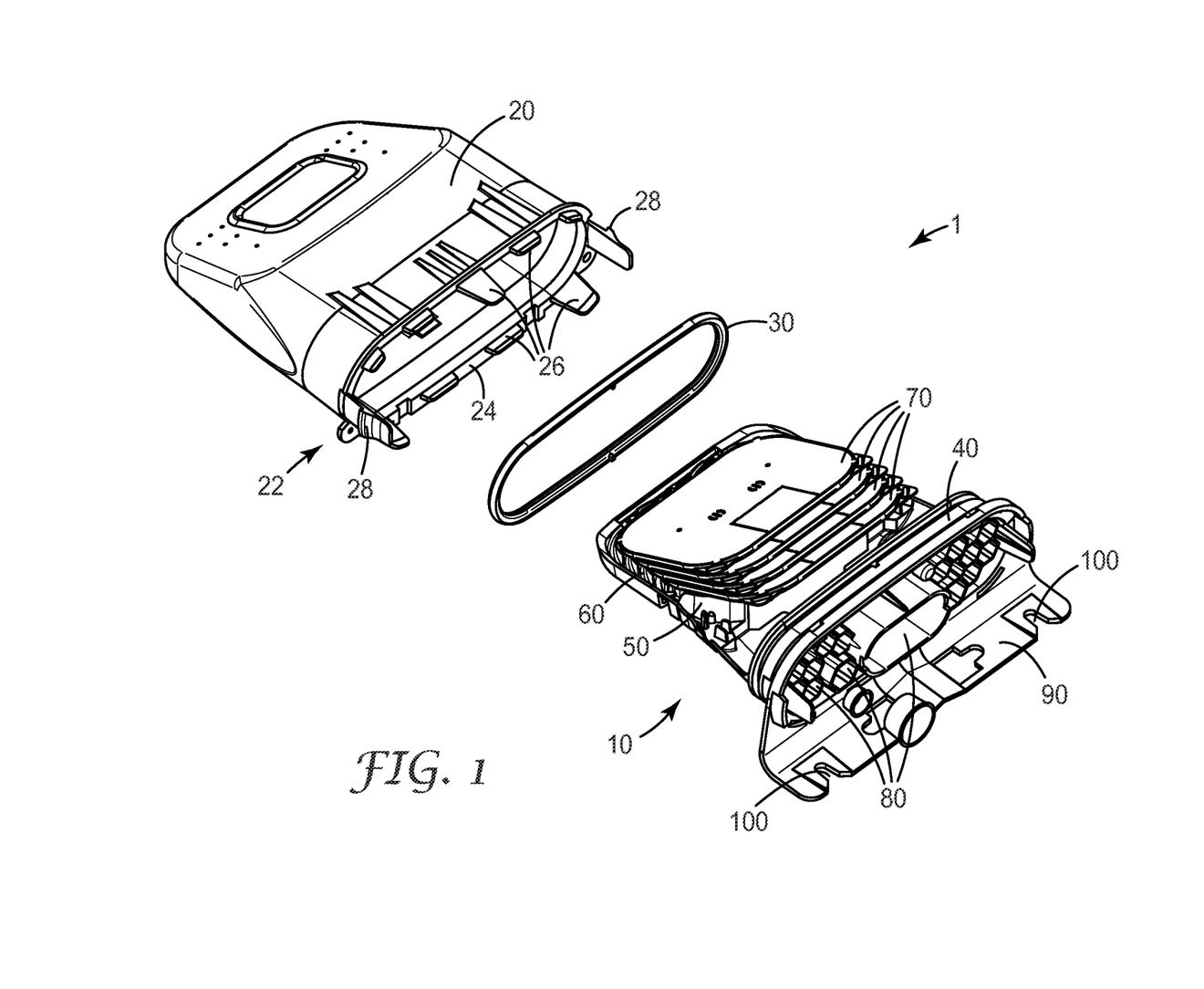
FIG. 1 Explosive view of an enclosure according to the invention.

FIG. 1 is a perspective explosive view of an optical fibre distribution enclosure 1 according to the invention. The enclosure 1 comprises a base element 10, a housing cover 20 and a sealing gasket 30. The base element 10 comprises a housing base 40, a slack fibre storage device 50 and a tray holder 60. Four fibre-optic trays 70 are pivotably mounted on the tray holder 60. In the pivot position shown in FIG. 1, the trays 70 obscure most of the slack fibre storage device 50, so that only a small part of the slack fibre storage device 50 is visible. The housing base 40 and the housing cover 20 can be engaged with each other to form a housing of the enclosure 1. The housing formed is watertight. The sealing gasket 30 contributes to the tightness of the housing formed. Once the housing base 40 and the housing cover 20 are engaged with each other, the slack fibre storage device 50 and the tray holder 60 are arranged within the housing. The sealing gasket 30 is arranged in a corresponding groove in the periphery of the housing base 40, so that upon engagement between the housing base 40 and the housing cover 20, the sealing gasket 30 is arranged between the housing base 40 and the housing cover 20. The sealing gasket 30 thereby provides a water-tight seal between the housing base 40 and the housing cover 20 and prevents entry of water, dust, or bugs into the enclosure 1.

The housing cover 20 forms a cavity, which is open at a lower end 22 of the housing cover 20. The opening of the cavity is delimited by a lower rim 24. The lower rim 24 is arranged on the periphery of the opening of the cavity. The housing base 40 and the housing cover 20 can be engaged with each other by gradually pushing the housing cover 20 over the base element 10, i.e. over the housing base 40, the tray holder 60, the slack fibre storage device 50 and over any trays 70 mounted on the tray holder 60, until the lower rim 24 of the housing cover 20 meets the housing base 40. Guides 26, protruding from the lower rim 24 facilitate proper positioning of the housing cover 20 with respect to the housing base 40 shortly before engagement. Latches 28, also protruding from the lower rim 24, can engage with corresponding cover fastening elements, which are latch openings (not visible in FIG. 1) in this embodiment, on the housing base 40 to provide engagement and fixation of the housing cover 20 to the housing base 40. The guides 26 and the latches 28 are described in more detail below. The housing cover 20 is made from a resilient polymeric material.

The housing base 40 is essentially flat and has two opposing major surfaces. One of these major surfaces faces towards the inside of the enclosure 1, the other major surface faces towards the outside of the enclosure 1. The major surface facing towards the inside of the enclosure 1 is flat. The slack fibre storage device 50 and the tray holder 60 are arranged on the major surface of the housing base 40 which faces towards the interior of the enclosure 1. The housing base 40, the slack fibre storage device 50 and the tray holder 60 are integrally formed as one piece. In other words, the base element 10 is one integrally formed piece and it comprises the housing base 40, the slack fibre storage device 50 and the tray holder 60. It is shown in more detail in FIG. 2. The base element 10 is integrally formed from a resilient polymeric material.

The housing base 40 comprises entry openings 80 for entry of a fibre-optic cable or of an optical fibre into the enclosure 1. When not used for entry of a fibre or a cable, the entry openings 80 are closed by thin closing walls, which can be broken and removed. When the closing wall of an entry opening 80 is broken and removed, a fibre or a cable can enter the enclosure 1 through the entry opening 80, e.g. via a fibre port, that can be inserted into the entry opening 80. The housing base 40 also comprises fastening means for fastening the enclosure 1 to a support, e.g. to a wall. In the embodiment shown, the fastening means is an attachment plate 90. The attachment plate 90 extends perpendicularly from the major surface of the housing base 40 which faces towards the outside of the enclosure 1. The attachment plate 90 has recesses 100 which can engage with screws, e.g. threaded into a wall of a building or a cabinet, to attach the housing base 40 and therewith the entire base element 10 to the wall.

Figure 2:
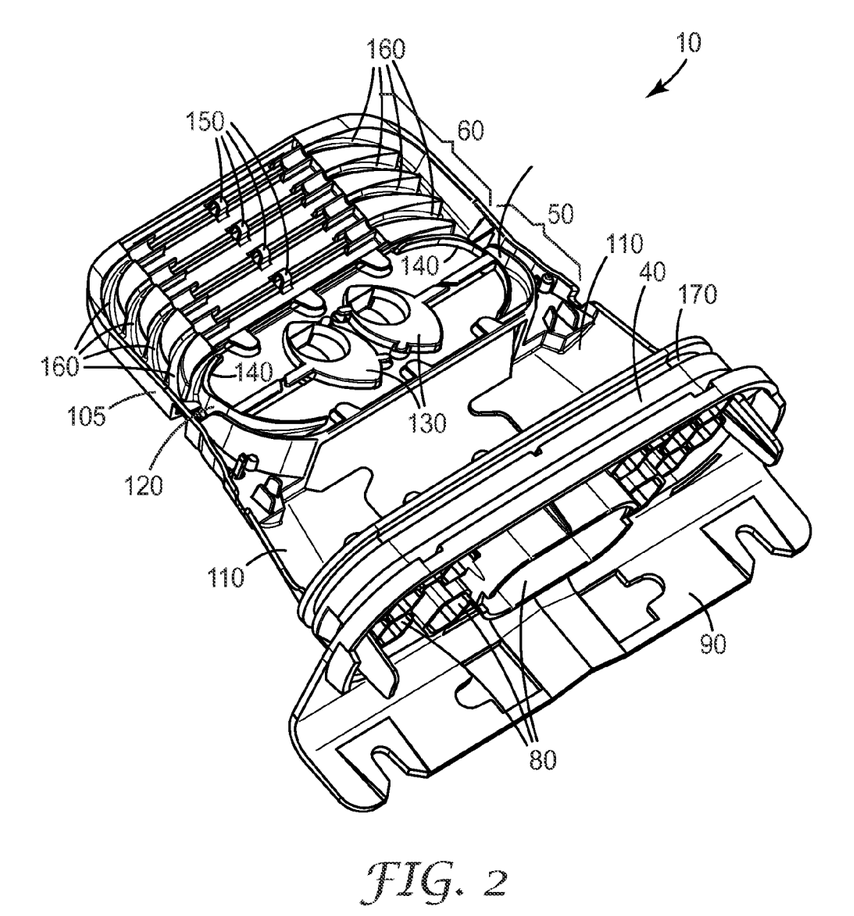
FIG. 2 Perspective view of the housing base, slack fibre storage device, and tray holder of the enclosure of FIG. 1.

FIG. 2 is a perspective view of the base element 10 of the enclosure of FIG. 1, with no trays 70 installed on the tray holder 60. The slack fibre storage device 50 is arranged between the housing base 40 and the tray holder 60. A support panel 105 extends perpendicularly from the inner flat surface of the housing base 40. The support panel 105 comprises two side bars 110, arranged between housing base 40 and the slack fibre storage device 50, which connect the slack fibre storage device 50 to the housing base 40, and which provide for an appropriate distance between the slack fibre storage device 50 to the housing base 40, so that optical fibres or cables entering the enclosure 1 through the entry openings 80 can be guided towards fibre entry portions 120 of the slack fibre storage device 50 without being overly bent. The support panel 105 is formed integrally as one piece with the housing base 40, the slack fibre storage device 50 and the tray holder 60. The slack fibre storage device 50 also comprises appropriately shaped fibre guiding elements 130 and guiding walls 140 along which optical fibres or fibre optic cables can be guided without violating their minimum bending radius.

The tray holder 60 is arranged, in this embodiment of the invention, adjacent to the slack fibre storage device 50, such that the slack fibre storage device 50 is arranged between the housing base 40 and the tray holder 60. This is, however, not essential, and in an alternative embodiment, there may be a distance between the slack fibre storage device 50 and the tray holder 60. The tray holder 60 comprises four centrally arranged tray hinges 150, which facilitate pivotable mounting of up to four fibre optic trays 70 on the tray holder 60 such that the pivot axis of each tray 70 is defined by the corresponding tray hinge 150, on which the tray 70 is mounted. Curved fibre guiding channels 160, on either side of the tray holder 60, can lead optical fibres towards the tray hinges 150, where fibres can enter a tray 70 in a direction parallel to the pivot axis of the respective tray 70. One fibre guiding channel 160 can lead a fibre towards a corresponding tray hinge 150 from a first direction (from the left, in FIG. 2), and a further fibre guiding channel 160 can lead a fibre towards the corresponding tray hinge 150 from a direction opposite to the first direction (from the right, in FIG. 2). This provides a high degree of flexibility in guiding optical fibres or cables into a fibre tray 70 or out of a fibre tray 70. The tray hinges 150 and the fibre guiding channels 160 are integrally formed with the other parts of the tray holder 60 and with the slack fibre storage device 50 and the housing base 40.

In the embodiment shown in FIG. 2, the slack fibre storage device 50 is arranged between the housing base 40 and the tray holder 60. This arrangement is, however, not essential, and in an alternative embodiment, the tray holder 60 may be arranged between the housing base 40 and the slack fibre storage device 50. In a yet alternative embodiment, the slack fibre storage device 50 and the tray holder 60 may be arranged back to back, facing into opposite directions. In a yet further alternative arrangement, a flat support plate may carry the back-to-back arranged slack fibre storage device 50 and the tray holder 60 on opposing major surfaces of the support plate. The support plate might also be integrally formed as one piece with the housing base 40, the slack fibre storage device 50 and the tray holder 60.

Optical fibres or fibre optic cables can enter the enclosure 1 through the entry openings 80 in the housing base 40. These entry openings 80 can accommodate entry mechanisms for fibres or cables. Alternatively, an entry opening 80 may be configured to accommodate a fibre-optic connector. A gasket groove 170 along the perimeter of the housing base 40 can accommodate the sealing gasket 30.

Figure 3:
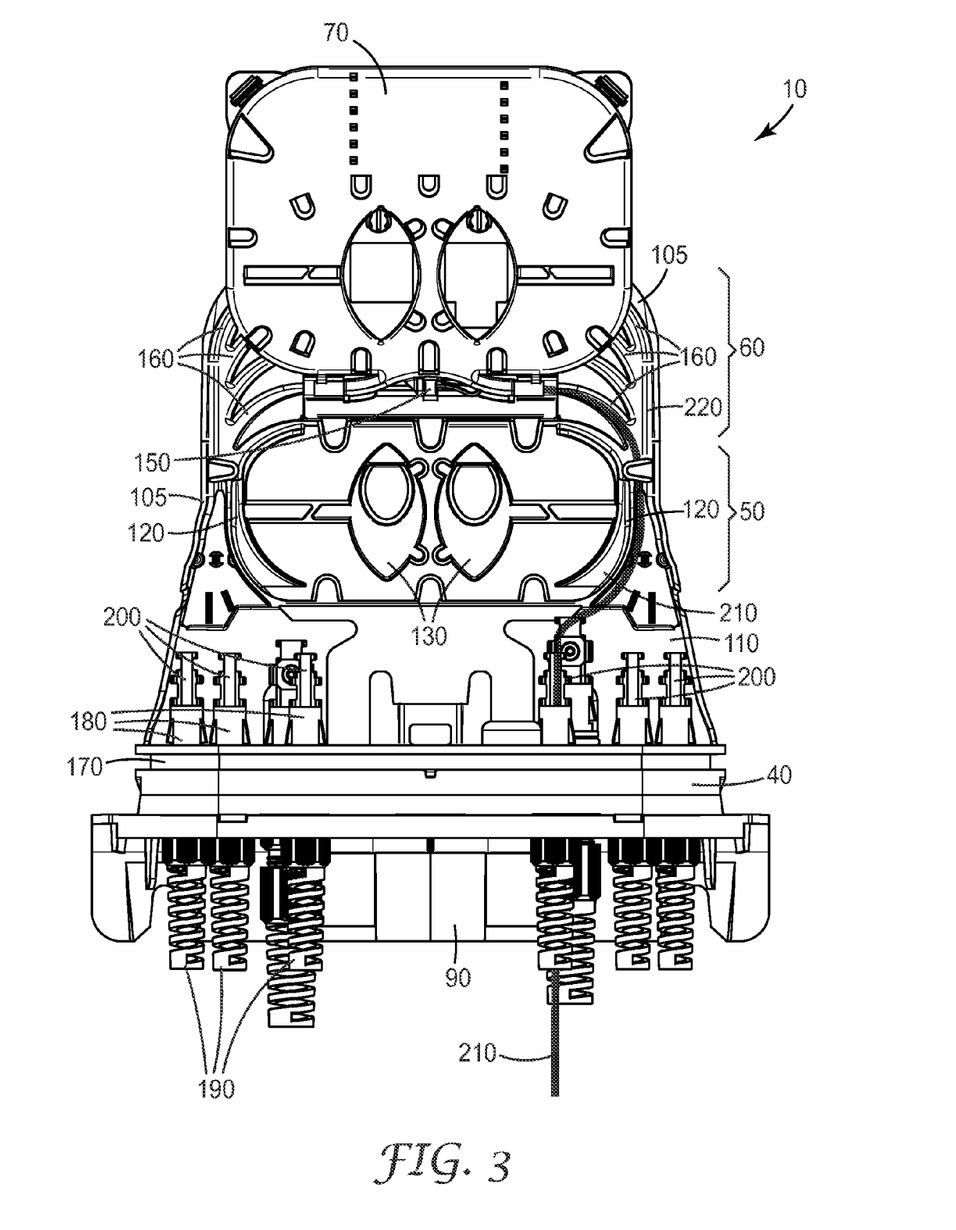
FIG. 3 Perspective view of the housing base, slack fibre storage device, and tray holder of the enclosure of FIG. 1, with an optical fibre tray and cable entries mounted.

FIG. 3 is a perspective view of the base element 10 of FIG. 2, with a fibre optic tray 70 mounted on the tray holder 60, and fibre ports 180 mounted in the entry openings 80. Optical fibres or fibre optic cables (can be guided into and/or out of the enclosure 1 through those entry openings 80. Each of the fibre ports 180 has a fibre boot 190, arranged on the outside of the enclosure 1, and a strain relief element 200, arranged on the inside of the enclosure 1. In FIG. 3, the fibre optic tray 70 is in a pivot-out position, so that only the underside of the tray 70 is visible.

An exemplary fibre routing path is shown for an optical fibre 210. It enters the enclosure 1 through the fibre boot 190 of a cable port 180, its strength member is fixed to the strain relief element 200 of the cable port 180, i.e. the fibre 210 enters the enclosure 1 through an entry opening 80. It is routed through the fibre entry portion 120 of the slack storage device 50 into a side routing channel 220 of the base element 10. From there, it is routed through a fibre guiding channel 160 towards the tray hinge 150 by which the fibre tray 70 is pivotably mounted on the tray holder 60. It enters the fibre tray 70 in the vicinity of the tray hinge 150, in a direction parallel to the pivot axis defined by the tray hinge 150.

The tray 70 is shown in a pivoted-out position. In that position, it permits access to the slack fibre storage device 50. The tray 70 can be pivoted into a pivoted-in position, in which it covers a large part of the slack fibre storage device 50.

Figure 4A:
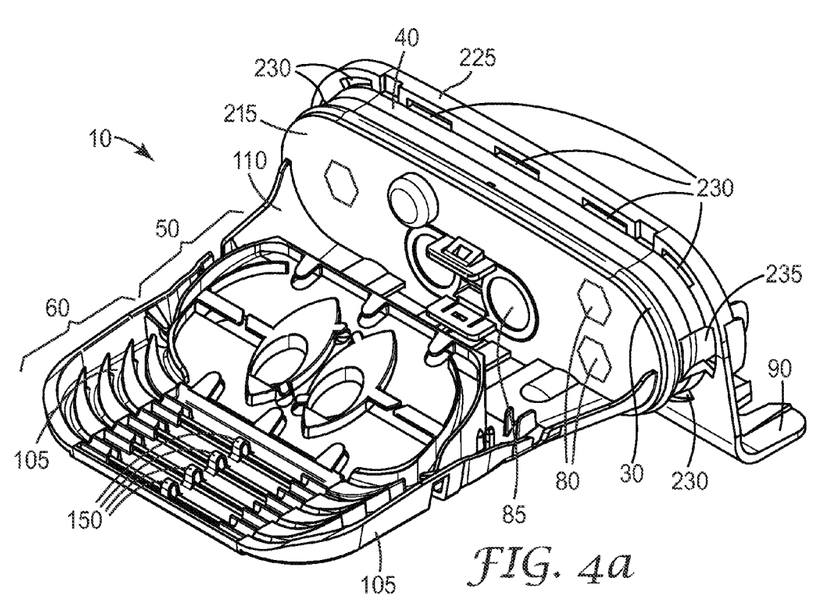
FIG. 4a Perspective view of the housing base of the enclosure of FIG. 1.

The housing cover 20 and the housing base 40 are engageable with each other to form the housing of the enclosure 1. FIG. 4a is a perspective view of the base element 10 of the enclosure 1 of FIG. 1. The sealing gasket 30 is installed in the gasket groove 170 of the housing base 40. The entry openings 80 are closed by thin walls, and no fibre or cable enters the enclosure 1 through them. A central entry opening 80 is larger than the other entry opening 80. The central entry opening 80 is closed by an insert 85 that can be manually removed in order to place a fibre port 180 into the central entry opening 80.

The housing base 40 comprises a inner flat surface 215, facing towards the inside of the enclosure 1 when the housing cover 20 is engaged. The housing base 40 comprises the support panel 105, which extends perpendicularly from an edge (the lower edge in FIG. 4a) of the inner flat surface 215 of the housing base 40. The slack fibre storage device 50 and the tray holder 60 are arranged on the support panel 105. The support panel 105, the housing base 40, the slack fibre storage device 50 and the tray holder 60 are integrally formed as one piece. For reasons of clarity, only some of the entry openings 80 are shown on the inner flat surface 215 of the housing base 40.

The housing base 40 further comprises a peripheral pedestal 225 with slit-shaped guide openings 230 arranged along its perimeter. The guide openings 230 extend from the upper side (i.e. the side facing towards the interior of the enclosure 1) of the pedestal 225 through the pedestal 225 to the lower side of the pedestal 225 (i.e. the side facing towards the exterior of the enclosure 1). The guide openings 230 are integrally formed as one piece with the housing base 40, the slack fibre storage device 50 and the tray holder 60. The guides 26, protruding from the lower rim 24 of the housing cover 20, can be inserted into these guide openings 230, when the enclosure 1 is closed by gradually pushing the housing cover 20 over the tray holder 60 and the slack fibre storage device 50 until the lower rim 24 touches the housing base 40 such that the housing cover 20 can engage with the housing base 40. Five of the guide openings 230 are visible on the upper side (in FIG. 4a) of the housing base 40. One guide opening 230 on the lower side (in the Figure) of the housing base 40, i.e. close to the attachment plate 90, is partly visible in FIG. 4a.

The pedestal 225 also comprises cover fastening elements, in the form of two latch openings 235, arranged in opposed positions on the perimeter of the pedestal 225. The latch openings 235 are integrally formed as one piece with the housing base 40, the slack fibre storage device 50 and the tray holder 60. Only one of these latch openings 235 is visible in FIG. 4a. The latch openings 235 extend from the upper side of the pedestal 225 through the pedestal 225 to the lower side of the pedestal 225. The latches 28, protruding from the lower rim 24 of the housing cover 20, can be inserted into these latch openings 235, when the enclosure 1 is closed by gradually pushing the housing cover 20 over the tray holder 60 and the slack fibre storage device 50 until the lower rim 24 touches the housing base 40 such that the housing cover 20 can engage with the housing base 40. The latch openings 235 are shaped such that they provide a latching engagement with the latches 28, when the housing cover 20 is in the final engagement position with respect to the housing base 40. Once engaged, the latches 28 engaged with latch openings 235 keep the housing cover in the final engagement position and prevent accidental separation of the housing cover 20 from the housing base 40. The latching engagement between the housing cover 20 and the housing base 40 can be released by simultaneously pushing the latches 28 inwardly, i.e. towards the interior of the enclosure 1, thereby disengaging the latches 28 from the latch openings 235. Once the latches 28 are released, the housing cover 20 can be removed from the housing base 40 by pulling it away from the housing base 40.

Figure 4B:
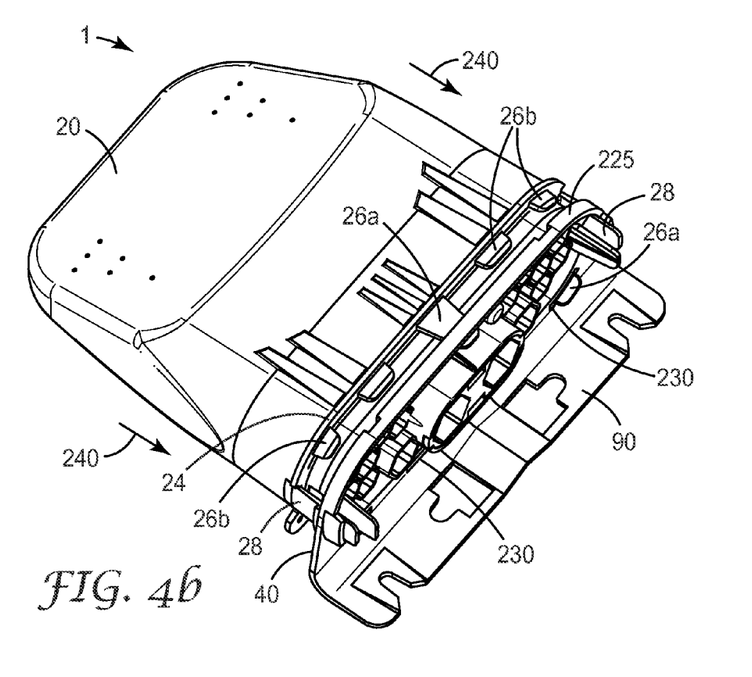
FIG. 4b Perspective view of the housing base and the housing cover of the enclosure of FIG. 1, in a position shortly before engagement, showing latches and guides on the housing cover.

FIG. 4b is a perspective view of the enclosure 1 of FIG. 1 and shows in more detail the mechanism by which the housing cover 20 and the housing base 40 of the enclosure 1 of FIG. 1 can be engaged with each other. Generally, for closing the enclosure 1, the housing cover 20 is pushed over the base element 10 comprising the housing base 40, the slack fibre storage device 50, and the tray holder 60, and over any trays 70, such that the cavity formed by the housing cover 20 accommodates those elements. The housing cover 20 is pushed towards the housing base 40 in a direction indicated by arrows 240, generally perpendicular to the plane of the housing base 40. Thereby, the lower rim 24 is gradually getting closer to the housing base 40. In the final engagement position, the lower rim 24 of the housing cover 20 contacts the housing base 40. As explained before, guides 26, protruding from the lower rim 24 facilitate proper positioning of the housing cover 20 with respect to the housing base 40 shortly before the housing cover 20 reaches the final engagement position. The housing cover comprises two types of guides 26, namely long guides 26a and short guides 26b. The housing cover 20 shown in FIG. 4b comprises three long guides 26a and six short guides 26b. The long guides 26a protrude further from the lower rim 24 of housing cover 20 than the short guides 26b protrude. As the housing cover 20 is gradually pushed over the tray holder 60 and the slack fibre storage device 50 towards the housing base 40, at a first distance between the lower rim 24 of the housing cover 20 and the housing base 40, the long guides 26a slip into corresponding guide openings 230 in the housing base 40. From that first distance onwards, up to a second distance, the housing cover 20 is thus guided towards its final, engaged position with respect to the housing base 40, by the long guides 26a only, as the housing cover 20 is gradually pushed towards the housing base 40. The second distance is smaller than the first distance. At the second, smaller distance between the lower rim 24 and the housing base 40, also the short guides 26b slip into corresponding guide openings 230 in the housing base 40. From that second distance onwards, the housing cover 20 is guided towards its final, engaged position with respect to the housing base 40, by the long guides 26a and the short guides 26b simultaneously. This provides a stronger guidance than guidance by the long guides 26a alone, and thus facilitates precise positioning of the housing cover 20 with respect to the housing base 40 shortly before and up to the final engagement position.

Both the long guides 26a and the short guides 26b are shaped such as to facilitate guiding of the housing cover 20 into the final engagement position. Both types of guides 26a, 26b have chamfered outer edges (i.e. edges farthest from the lower rim 24), so that they can easily slip into the corresponding guide openings 230 in the housing base 40. Also, all guides 26a, 26b are shaped such that they are broader and wider where they protrude from the lower rim 24, than they are further from the lower rim 24. This shape facilitates gradually stricter guidance of the housing cover 20 into the final engagement position, as the housing cover 20 is gradually pushed over the tray holder 60 and the slack fibre storage device 50 into the final engagement position. The guides 26a, 26b can thus be considered to form truncated rectangular-based pyramids. This shape facilitates gradually stricter guidance of the housing cover 20 into the final engagement position, as the housing cover 20 is gradually pushed over the tray holder 60 and the slack fibre storage device 50 into the final engagement position. The truncated rectangular-based pyramids have chamfered top edges.

The housing cover 20 comprises two latches 28, which protrude from the lower rim 24. These latches 28 are arranged at opposed locations on the perimeter of the lower rim 24. They can engage with corresponding latch openings 235 in the housing base 40 (not visible in FIG. 1) to provide fixation of the housing cover 20 to the housing base 40 in the final engagement position. The latches 28 are made from resilient polymeric material. When the housing cover 20 is pushed over the housing base 40 into the final engagement position, the latches 28 resiliently move outwardly from the rim 24, thereby engaging with edges of the corresponding latch openings 235. This "clip" connection, formed by the latches 28 and the corresponding latch openings 235, prevents movement of the housing cover 20 away from the housing base 40, i.e. generally in a direction opposite to the direction indicated by the arrow 240. The latches 28 thus secure the housing cover 20 to the housing base 40 in the final engagement position.

In the embodiment shown in FIGS. 4a and 4b, optical fibre distribution enclosure 1, includes a housing base 40, a housing cover 20, engageable with each other to form a housing of the enclosure 1, A sealing gasket 30 disposed in a gasket groove 170 formed along the perimeter of the base housing. The gasket groove 170 can be integrally formed as one piece with the housing base 40. The sealing gasket 30 is disposed around and contacts the housing base 40 and provides sealing of the enclosure 1 between the housing base 40 and the housing cover 20 when the housing cover is secured to or engaged with the housing base. The housing base 40 further comprises a peripheral pedestal 225 with slit-shaped guide openings 230 and cover fastening elements 235 arranged on a perimeter of the pedestal, and a plurality of entry openings 80 for cables to enter enclosure 1, wherein the wherein the guide openings and the cover fastening elements 235 are integrally formed as one piece with the housing base 40. The housing cover comprises a lower rim 24 having guides 26 and latches 28 that protrude from the lower rim. The guides 26 engage with guide openings 230 in the housing base 40 to facilitate proper positioning of the housing cover 20 with respect to the housing base 40 and the latches 28 engage with fastening elements 235 to engage the housing base 40 with the housing cover 20. In an exemplary aspect, the housing of the enclosure 1 is watertight when closed by engaging the housing base 40 with the housing cover 20, The enclosure has a compact size having a volume is 2 liters or less when closed.

Figure 5:
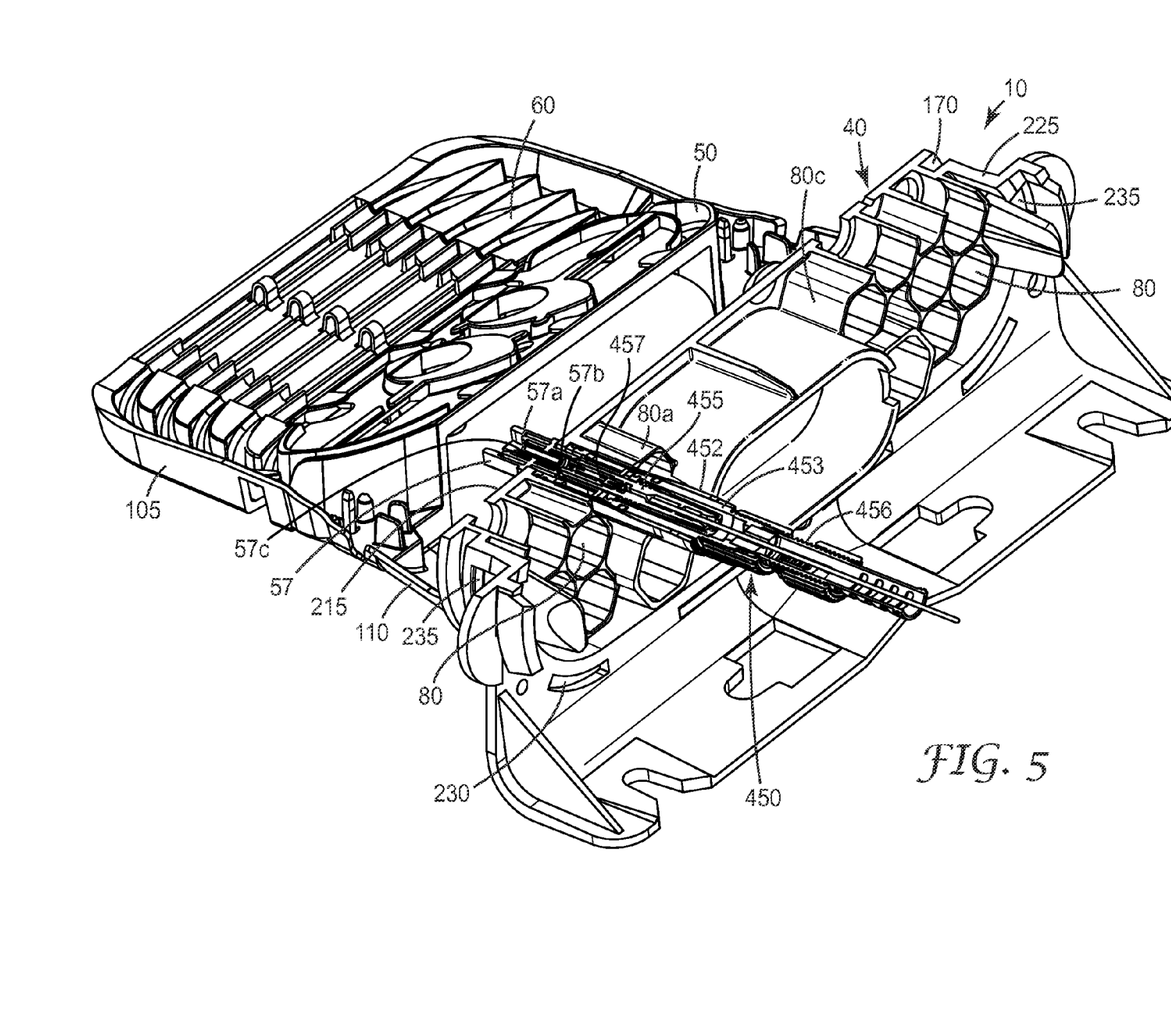
FIG. 5 Sectioned perspective view of the housing base, slack fibre storage device, tray holder of FIG. 1 having fibre optic connector adapters disposed in the entry openings of the housing base such that the interconnection of optical fibre connectors within the entry openings of the exemplary enclosure.

In one aspect, the housing base further comprises wherein the housing base (40), the slack fibre storage device (50) and the tray holder (60) are integrally formed from polymeric material. For example, the slack fibre storage device (50) and the tray holder (60) are arranged on a support panel (105) which extends perpendicularly from a flat surface (215) of the housing base (40). A plurality of fibre-optic trays can be pivotally mounted on the tray holder (60). The fibre-optic trays can be configured to include at least one of optical fibre storage section, optical fibre splices, a wavelength division multiplexer, a signal attenuator, an optical splitter, and a wavelength filter. FIG. 5 is a sectioned perspective view showing alternative base element 10 of the exemplary enclosure configured to support the interconnection of optical fibre connectors within the entry openings of the exemplary enclosure. Base element 10 includes a housing base 40, slack fibre storage device 50, tray holder 60 as described previously. The sealing gasket (not shown) is installed in the gasket groove 170 formed along the perimeter of the base housing, wherein the sealing gasket provides sealing of the enclosure between the housing base and the housing cover.

Figure 6:
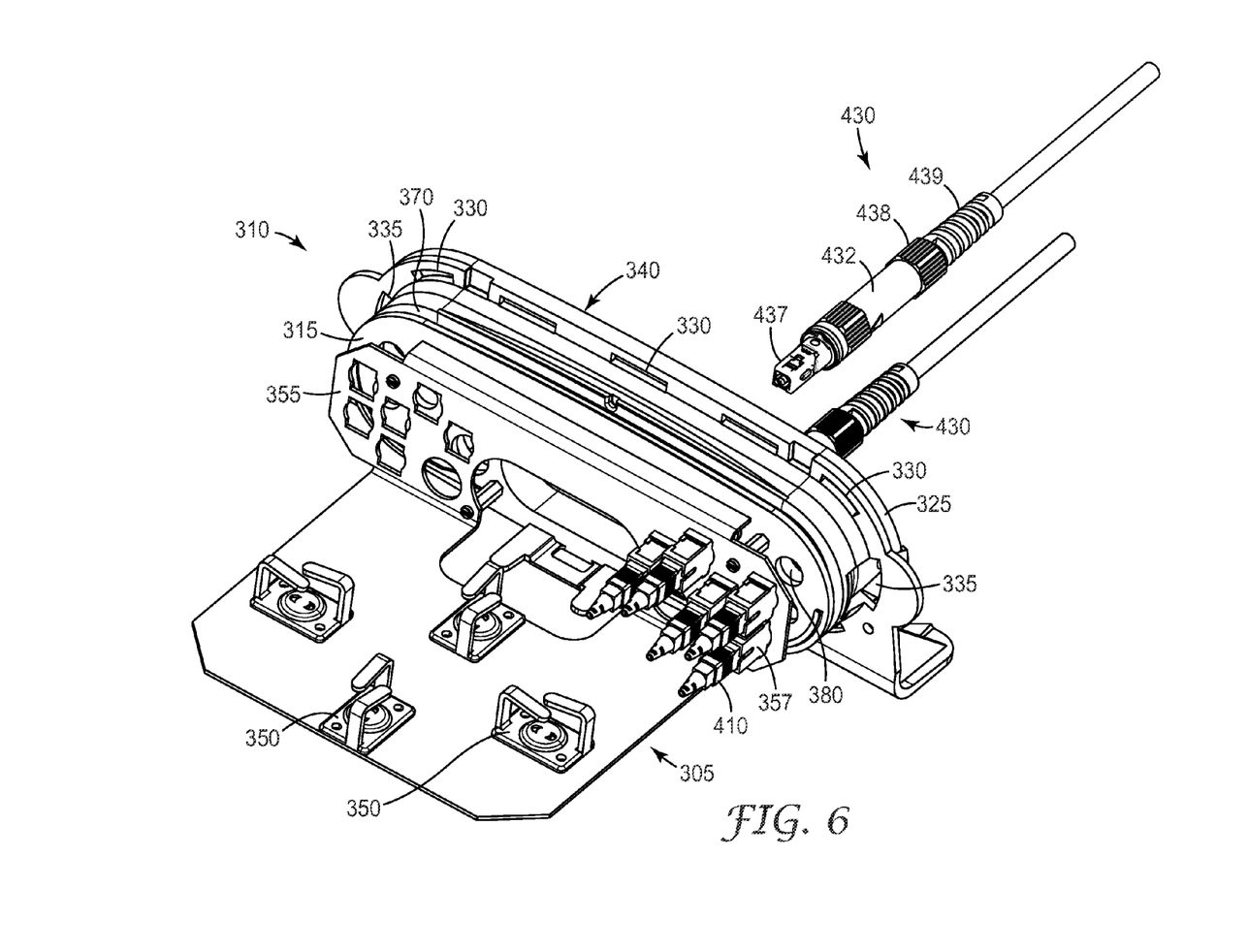
FIG. 6 Perspective view of the housing base, support plate and support element that support the interconnection of optical fibre connectors within the interior of the exemplary enclosure.

Housing base 40 has a central entry opening, as described previously, is larger than the other entry openings 80, a inner flat surface 215, facing towards the inside of the enclosure when the housing cover 40, shown in FIGS. 1 and 4*b* is engaged with the base housing. The housing base 40 comprises the support panel 105, disposed perpendicularly to the inner flat surface 215 of the housing base 40. Fibre optic connector adapters 57 can be disposed at least partially within the entry openings 80 to facilitate mating of two fibre optic connectors. The fibre optic connector adapters 57 can be configured to accept a first optical connector inserted through an entry opening and a second standard format optical connector (e.g. SC-format optical connectors, LC-simplex format optical connectors, LC-duplex format optical connectors and MT-format optical connectors, note only one is shown in FIG. 6) within the enclosure. Thus, the connection interface between the first and second optical connectors is located within the entry opening of the exemplary enclosure.

Exemplary fibre optic connector adapters 57 that can be secured within the entry opening of the exemplar enclosures are described in U.S. Patent Application No. 61/846,823, which is incorporated by reference. For example, the exemplary fibre optic connector adapter has a first connector housing 57*b* disposed within the exterior section 80*a* of the entry opening, a second connector housing 57*a* disposed within the interior of the telecommunication enclosure, and an alignment sleeve 57*c* extending between the first and second housings along a central axis of the optical coupling. In an exemplary aspect, the optical coupling is secured directly within the port of the telecommunication enclosure via a snap-fit. In an exemplary aspect, the first connector housing provides four interconnection points with engagement features of the first optical connector 450 and the second connector housing provides at least two connection points with the second optical connector.

Exemplary first optical connectors 450 can be ruggedized optical fibre connectors that are either field mounted or factory terminated on the terminal end of a fibre optic drop cable, such as the optical fibre connectors described in U.S. Patent Application No. 61/846,816, which is incorporated by reference. For example, the exemplary first optical connector 450 can include an assembly base 452 having a first end and a second end, an outer housing 457 attached to the first end of the assembly base to hold an optical connection portion 455 disposed partially within the first end of the assembly base and a strain relief assembly 456 disposed on the second end of the assembly base. The assembly base 452 includes a body portion and a release portion which defines a release mechanism that causes the release portion to move relative to the body portion. The release portion includes at least one cam that is configured to release or disengage the at least one latch element when the release portion moves with respect to the body portion so that the optical fibre connector can be removed from the port of the telecommunication enclosure. The connection portion includes the internal components of a conventional fibre optic connector and the outer housing replaces the outer shell of the conventional connector.

Exemplary second optical fibre connectors (not shown) can be format optical connectors such as the 3M™ Crimplok™+Connector, the 3M™ No Polish Connector available from 3M Company (St. Paul, Minn.) or other industry standard connector having the same format as the fibre optic connector adapters installed in the support element in the exemplary enclosure.

The housing base 40 further comprises a peripheral pedestal 225 with slit-shaped guide openings 230 arranged along its perimeter. The guide openings 330 extend from the upper side (i.e. the side facing towards the interior of the enclosure) of the pedestal 225 through the pedestal 225 to the lower side of the pedestal 225 (i.e. the side facing towards the exterior of the enclosure). The guide openings 230 are integrally formed in housing base 40. The guides 26, protruding from the lower rim 24 of the housing cover 20, as shown in FIGS. 1 and 4*b*, can be inserted into these guide openings 230, when the enclosure is closed by gradually pushing the housing cover over the internal structure extending from the housing base (i.e. the support panel, support element, the tray holder and/or the slack fibre storage device depending on the enclosure configuration) until the lower rim of the cover touches the housing base such that the housing cover is engage with the housing base.

The pedestal 225 also comprises cover fastening elements, in the form of two latch openings 235, arranged in opposed positions on the perimeter of the pedestal. The latch openings 335 are integrally formed in the housing base 40. Latch openings 235 extend from the upper side of the pedestal 225 through the pedestal to the lower side of the pedestal. The latches 28, protruding from the lower rim 24 of the housing cover 20, as shown in FIGS. 1 and 4*b*, can be inserted into these latch openings 235, when the enclosure is closed by gradually pushing the housing cover 20 over the internal structure extending from the housing base until the lower rim 24 touches the housing base 40. The latch openings 235 are shaped such that they provide a latching engagement with the latches 28, when the housing cover 20 is in the final engagement position with respect to the housing base 40. Once engaged, the latches 28 engaged with latch openings 235 keep the housing cover in the final engagement position and prevent accidental separation of the housing cover 20 from the housing base 40. The latching engagement between the housing cover 20 and the housing base 40 can be released by simultaneously pushing the latches 28 inwardly, i.e. towards the interior of the enclosure 1, thereby disengaging the latches 28 from the latch openings 235. Once the latches 28 are released, the housing cover 20 can be removed from the housing base 40 by pulling it away from the housing base.

FIG. 6 is a perspective view of an alternative base element 310 of the exemplary enclosure. The sealing gasket (not shown) is installed in the gasket groove 370 formed along the perimeter of the base housing, wherein the sealing gasket provides sealing of the enclosure between the housing base and the housing cover. The housing base 340 is similar to base housing 40 shown in FIGS. 1-3 and 4*a*. Housing base has a central entry opening, as described previously, is larger than the other entry openings 80, a inner flat surface 315, facing towards the inside of the enclosure when the housing cover 20, shown in FIGS. 1 and 4*b* is engaged with the base housing. The housing base 340 comprises the support panel 305, disposed perpendicularly to the inner flat surface 315 of the housing base 340. The slack fibre storage devices 350 in the form of cable management rings are arranged on the support panel 305.

The enclosure can further include a support element 355 for supporting one or more fibre optic connectors 410, 430. Support element 355 can hold a plurality of fibre optic connector adapters 357 configured to accept and facilitate mating of two fibre optic connectors 410,430. The fibre optic connector adapters 357 can be configured to accept two standard format optical connectors (e.g. SC-format optical connectors, LC-simplex format optical connectors, LC-duplex format optical connectors and MT-format optical connectors, note only one is shown in FIG. 6) within the enclosure or a first optical connector inserted through an entry opening and a second optical connector disposed within the enclosure. In the exemplary aspect shown in FIG. 6, first optical connector 430 is inserted through an entry opening 380 in base housing connected with a second optical connector 410 disposed within the enclosure by fibre optic connector adapters 357. Thus the connection interface between the first and second optical connectors is located within the interior of the exemplary enclosure.

Exemplary first optical connectors 430 can be ruggedized optical fibre connectors that are either field mounted or factory terminated on the terminal end of a fibre optic drop cable, such as the optical fibre connectors described in PCT Publication No. WO2013/106183 and the first embodiment in U.S. Patent Application No. 61/846,816, both of which are incorporated by reference. For example, the exemplary first optical connector 430 includes The exemplary connector has a main body 432 with an interior passageway extending from a first end to a second end of the main body and an compression member 438 with integral bend control boot 439 attached to the second end of the main body wherein the compression member cooperated with the second end of the main body to compress an internal sealing member to provide an environmental seal between the cabled terminated by the connector and the main body of the connector, a optical connection portion disposed at least partially within the interior of the main body, and an outer housing 437 disposed over the connection portion wherein the outer housing has an external shape mateable with a standard format optical coupling. The connection portion includes the internal components of a conventional fibre optic connector and the outer housing replaces the outer shell of the conventional connector. The outer housing can be configured to have a standard connector format such as an SC or LC connector format.

Exemplary second optical fibre connectors can be format optical connectors such as the 3M™ Crimplok™+Connector, the 3M™ No Polish Connector available from 3M Company (St. Paul, Minn.) or other industry standard connector having the same format as the fibre optic connector adapters installed in the support element in the exemplary enclosure.

In one aspect, the support element, support panel 305, and the housing base 340 can be integrally formed as one piece such that the support element is disposed generally parallel to the inner flat surface 315 of the housing base 340. While in another aspect, the support panel and the support element can be integrally formed and attached to the housing base by mechanical fasteners such that the support element is disposed generally parallel to the inner flat surface 315 of the housing base 340.

The housing base 340 further comprises a peripheral pedestal 325 with slit-shaped guide openings 330 arranged along its perimeter. The guide openings 330 extend from the upper side (i.e. the side facing towards the interior of the enclosure) of the pedestal 325 through the pedestal 325 to the lower side of the pedestal 325 (i.e. the side facing towards the exterior of the enclosure). The guide openings 330 are integrally formed in housing base 340. The guides 26, protruding from the lower rim 24 of the housing cover 20, as shown in FIGS. 1 and 4b, can be inserted into these guide openings 330, when the enclosure is closed by gradually pushing the housing cover over the internal structure extending from the housing base (i.e. the support panel, support element, the tray holder and/or the slack fibre storage device depending on the enclosure configuration) until the lower rim of the cover touches the housing base such that the housing cover is engage with the housing base.

The pedestal 325 also comprises cover fastening elements, in the form of two latch openings 335, arranged in opposed positions on the perimeter of the pedestal. The latch openings 335 are integrally formed in the housing base 40. Latch openings 335 extend from the upper side of the pedestal 325 through the pedestal to the lower side of the pedestal. The latches 28, protruding from the lower rim 24 of the housing cover 20, as shown in FIGS. 1 and 4b, can be inserted into these latch openings 335, when the enclosure is closed by gradually pushing the housing cover 20 over the internal structure extending from the housing base until the lower rim 24 touches the housing base 340. The latch openings 335 are shaped such that they provide a latching engagement with the latches 28, when the housing cover 20 is in the final engagement position with respect to the housing base 340. Once engaged, the latches 28 engaged with latch openings 335 keep the housing cover in the final engagement position and prevent accidental separation of the housing cover 20 from the housing base 340. The latching engagement between the housing cover 20 and the housing base 340 can be released by simultaneously pushing the latches 28 inwardly, i.e. towards the interior of the enclosure 1, thereby disengaging the latches 28 from the latch openings 335. Once the latches 28 are released, the housing cover 20 can be removed from the housing base 340 by pulling it away from the housing base.

The following is a non-comprehensive list of possible embodiments of the invention.

Embodiment 1

Optical fibre distribution enclosure (1), comprising
a housing base (40) and a housing cover (20), engageable with each other to form a housing of the enclosure (1),
a slack fibre storage device (50), arranged within the housing when the housing base (40) and the housing cover (20) are engaged with each other,
a tray holder (60), arranged within the housing when the housing base (40) and the housing cover (20) are engaged with each other, on which tray holder (60) one or more fibre-optic trays (70) can be mounted,
characterized in that the housing base (40), the slack fibre storage device (50) and the tray holder (60) are integrally formed as one piece.

Embodiment 2

Enclosure (1) according to embodiment 1, wherein the housing base (40), the slack fibre storage device (50) and the tray holder (60) are integrally formed from polymeric material.

Embodiment 3

Enclosure (1) according to any one of embodiments 1 or 2, wherein the slack fibre storage device (50) is arranged between the housing base (40) and the tray holder (60).

Embodiment 4

Enclosure (1) according to any one of embodiments 1 or 2, wherein the tray holder (60) is arranged between the housing base (40) and the slack fibre storage device (50).

Embodiment 5

Enclosure (1) according to any one of the preceding embodiments, wherein the housing base (40) comprises an entry opening (80) for entry of a cable or of a fibre into the enclosure (1).

Embodiment 6

Enclosure (1) according to any one of the preceding embodiments, further comprising a support element for supporting one or more fibre optic connectors, and wherein the support element is integrally formed as one piece with the housing base (40), the slack fibre storage device (50) and the tray holder (60).

Embodiment 7

Enclosure (1) according to any one of the preceding embodiments, wherein the housing base (40) further comprises a cover fastening element (235) for engaging the housing cover (20) with the housing base (40), and wherein the cover fastening element (235) is integrally formed as one piece with the housing base (40), the slack fibre storage device (50) and the tray holder (60).

Embodiment 8

Enclosure (1) according to embodiment 7, wherein the cover fastening element (235) comprises a latch opening (235), operable to engage with a latch (28) on the housing cover (20) such as to engage the housing base (40) with the housing cover (20), or wherein the cover fastening element (235) comprises a latch, operable to interact with a latch opening on the housing cover (20) such as to engage the housing base (40) with the housing cover (20).

Embodiment 9

Enclosure (1) according to any one of the preceding embodiments, further comprising fastening means (90) for fastening the enclosure (1) to a support, wherein the fastening means (90) is/are integrally formed as one piece with the housing base (40), the slack fibre storage device (50) and the tray holder (60).

Embodiment 10

Enclosure (1) according to any one of the preceding embodiments, further comprising a sealing gasket (30) for sealing the enclosure (1), the sealing gasket (30) being arranged such that, when the housing base (40) and a housing cover (20) are engaged with each other to form a housing of the enclosure (1), the sealing gasket (30) contacts the housing base (40) and the housing cover (20) and provides sealing of the enclosure (1) between the housing base (40) and the housing cover (20).

Embodiment 11

Enclosure (1) according to any one of the preceding embodiments, wherein the housing base (40) comprises a gasket groove (170) for accommodating a sealing gasket (30), the gasket groove (170) being integrally formed as one piece with the housing base (40), the slack fibre storage device (50) and the tray holder (60).

Embodiment 12

Enclosure (1) according to any one of the preceding embodiments, wherein the housing base (40) comprises a flat surface (215), and wherein the slack fibre storage device (50) and the tray holder (60) are arranged on a support panel (105) which extends perpendicularly from the flat surface (215) of the housing base (40) and which is integrally formed as one piece with the housing base (40), the slack fibre storage device (50) and the tray holder (60).

Embodiment 13

Enclosure (1) according to any one of the preceding embodiments, wherein the enclosure (1) is adapted such that at least four fibre-optic trays (70) can be mounted on the tray holder (60), wherein the housing of the enclosure (1) is watertight when closed by engaging the housing base (40) with the housing cover (20), and wherein the volume of water displaced by the enclosure (1) when the enclosure (1) is closed and completely submerged in water, is 2 liters (i.e. 2 dm$^3$) or less.

Embodiment 14

Optical fibre distribution enclosure (1), comprising
a housing base (40), a housing cover (20), engageable with each other to form a housing of the enclosure (1), and a sealing gasket (30) disposed in a gasket groove (170) formed along the perimeter of the base housing, wherein the sealing gasket (30) provides sealing of the enclosure (1) between the housing base (40) and the housing cover (20);
wherein the housing base (40) further comprises a peripheral pedestal (225) with slit-shaped guide openings 230 and cover fastening element arranged on a perimeter of the pedestal, and a plurality of entry openings (80) for cables to enter enclosure (1), wherein the wherein the guide openings and the cover fastening elements (235) are integrally formed as one piece with the housing base (40);
wherein the housing cover comprises a lower rim (24), guides (26) and latches (28) protruding from the lower rim, wherein the guides (26) engage with guide openings 230 in the base housing (40) to facilitate proper positioning of the housing cover (20) with respect to the housing base (40) and wherein the latches (28) engage with fastening element (235) to engage the housing base (40) with the housing cover (20).

Embodiment 15

Enclosure (1) according to embodiment 14, further comprises a slack fibre storage device (50) and a tray holder (60) is integrally formed with the housing base (40).

Embodiment 16

Enclosure (1) according to any one of previous embodiments, further comprising a plurality of fibre optic connector adapters within the enclosure for interconnecting optical fibre connectors.

Embodiment 17

Enclosure (1) according to any one of embodiments 6 and 16, wherein the plurality of fibre optic connector adapters is disposed in a support element within the enclosure.

Embodiment 18

Enclosure (1) according to embodiment 17, wherein the support element is integrally formed as one piece with the housing base (40), the slack fibre storage device (50) and the tray holder (60).

Embodiment 19

Enclosure (1) according to embodiment 17, wherein each of the plurality of fibre optic connector adapters is disposed in the entry opening of the enclosure.

Embodiment 20

Enclosure (1) according to any of embodiments 16-19, wherein each of the optical fibre connector adapters is configured to interconnect a first optical connector inserted through the entry opening of the enclosure and a second optical connector disposed within the enclosure.

Embodiment 21

Enclosure (1) according to any of embodiments 16-19, wherein each of the optical fibre connector adapters is configured to interconnect two optical connectors disposed within the enclosure.

Embodiment 22

Enclosure (1) according to any one of embodiments 14-21, wherein the housing base (40) comprises a flat surface (215), and wherein the slack fibre storage device (50) and the tray holder (60) are arranged on a support panel (105) which extends perpendicularly from the flat surface (215) of the housing base (40) and which is integrally formed as one piece with the housing base (40), the slack fibre storage device (50) and the tray holder (60)

Embodiment 23

Enclosure (1) according to any one embodiment 16-22, further comprising a plurality of fibre-optic trays pivotally mounted on the tray holder (60), wherein the fibre-optic trays contain at least one of optical fibre storage, optical fibre splices, a wavelength division multiplexer, a signal attenuator, an optical splitter and a wavelength filter.

Embodiment 24

Enclosure (1) according to any one of embodiment 14-23, wherein the housing of the enclosure (1) is watertight when closed by engaging the housing base (40) with the housing cover (20), and wherein the volume the closed enclosure (1) is 2 liters or less.

Embodiment 25

Enclosure (1) according to any one of previous embodiments, further comprising a plurality of fibre optic connector adapters within the enclosure for interconnecting optical fibre connectors.

Embodiment 26

Enclosure (1) according to any one of embodiments 6 and 21, wherein the plurality of fibre optic connector adapters is disposed in a support element within the enclosure.

Embodiment 27

Enclosure (1) according to embodiment 26, wherein the support element is integrally formed as one piece with the housing base (40), the slack fibre storage device (50) and the tray holder (60).

Embodiment 28

Enclosure (1) according to embodiment 11, wherein each of the plurality of fibre optic connector adapters is disposed in the entry opening of the enclosure.

Embodiment 29

Enclosure (1) according to any of embodiments 20-28, wherein each of the optical fibre connector adapters is configured to interconnect a first optical connector inserted through the entry opening of the enclosure and a second optical connector disposed within the enclosure.

Embodiment 30

Enclosure (1) according to any of embodiments 20-28, wherein each of the optical fibre connector adapters is configured to interconnect two optical connectors disposed within the enclosure.

The invention claimed is:

1. Optical fibre distribution enclosure, comprising
a housing base, a housing cover, engageable with each other to form a housing of the enclosure, and a sealing gasket disposed in a gasket groove formed along a perimeter of the base housing, wherein the sealing gasket provides sealing of the enclosure between the housing base and the housing cover;
wherein the housing base further comprises a peripheral pedestal with slit-shaped guide openings and cover fastening elements arranged around the perimeter of the pedestal, and a plurality of entry openings for cables to enter enclosure, wherein the guide openings and the cover fastening elements are integrally formed as one piece with the housing base;
wherein the housing cover comprises a lower rim, guides and latches protruding from the lower rim, wherein the guides engage with guide openings in the base housing to facilitate proper positioning of the housing cover with respect to the housing base and wherein the latches engage with fastening element to engage the housing base with the housing cover.

2. The enclosure of claim 1, further comprises a slack fibre storage device and a tray holder are integrally formed with the housing base.

3. The enclosure of claim 1, further comprising a plurality of fibre optic connector adapters within the enclosure for interconnecting optical fibre connectors.

4. The enclosure of claim 3, wherein the plurality of fibre optic connector adapters are disposed in a support element within the enclosure.

5. The enclosure of claim 4, wherein the support element is integrally formed as one piece with the housing base, the slack fibre storage device and the tray holder.

6. The enclosure of claim 3, wherein each of the plurality of fibre optic connector adapters is disposed in the entry opening of the enclosure.

7. The enclosure of claim 6, wherein each of the plurality of fibre optic connector adapters is disposed in the entry opening of the enclosure.

8. The enclosure of claim 3, wherein each of the optical fibre connector adapters is configured to interconnect a first optical connector inserted through the entry opening of the enclosure and a second optical connector disposed within the enclosure.

9. The enclosure of claim 3, wherein each of the optical fibre connector adapters is configured to interconnect two optical connectors disposed within the enclosure.

10. The enclosure of claim 1, wherein the housing base comprises a flat surface, and wherein the slack fibre storage device and the tray holder are arranged on a support panel which extends perpendicularly from the flat surface of the housing base and which is integrally formed as one piece with the housing base, the slack fibre storage device and the tray holder.

11. The enclosure of claim 1, further comprising a plurality of fibre-optic trays pivotally mounted on the tray holder, wherein the fibre-optic trays contain at least one of optical fibre storage, optical fibre splices, a wavelength division multiplexer, a signal attenuator, an optical splitter and a wavelength filter.

12. The enclosure of claim 1, wherein the housing of the enclosure is watertight when closed by engaging the housing base with the housing cover defining a volume, and wherein the volume the closed enclosure is 2 liters or less.

\* \* \* \* \*

UNITED STATES PATENT AND TRADEMARK OFFICE
CERTIFICATE OF CORRECTION

PATENT NO.           : 9,513,451 B2
APPLICATION NO.      : 14/432535
DATED                : December 6, 2016
INVENTOR(S)          : Christophe Corbille It is certified that error appears in the above-identified patent and that said Letters Patent is hereby corrected as shown below:

In the Specification

Column 19,
Line 59, delete "the volume the closed enclosure" and insert -- the volume of the closed structure -- in place thereof.

In the Claims

Column 21,
Line 31, Claim 12 last line delete "the volume the closed enclosure" and insert -- the volume of the closed structure -- in place thereof.

Signed and Sealed this
Eighteenth Day of July, 2017

Joseph Matal
*Performing the Functions and Duties of the
Under Secretary of Commerce for Intellectual Property and
Director of the United States Patent and Trademark Office*